Aug. 15, 1950     H. NEIDHART-LOCHER     2,518,809
SPRING MOUNTING MEANS FOR VEHICLE WHEELS
Filed Feb. 6, 1946
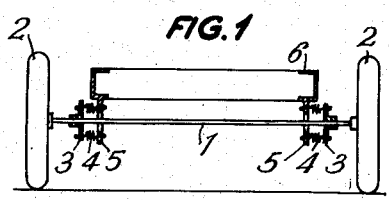
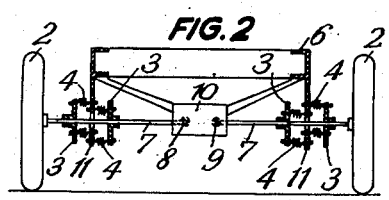
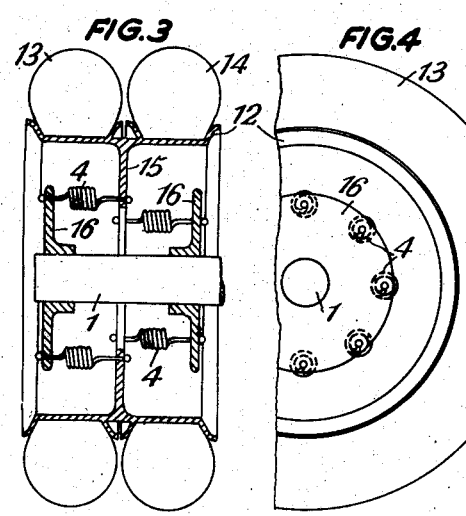
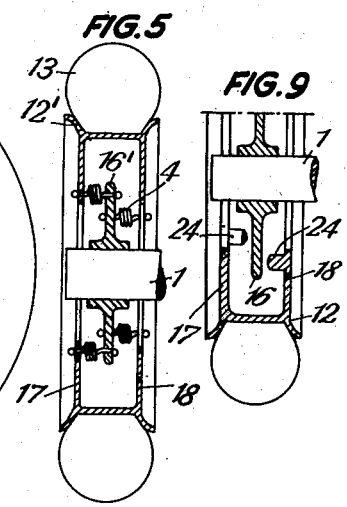
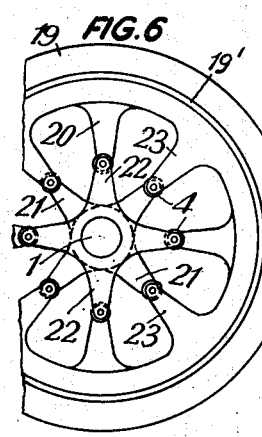
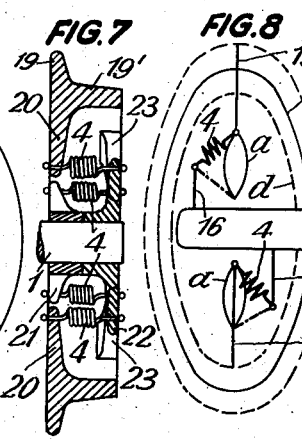
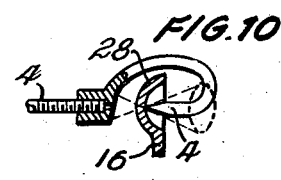
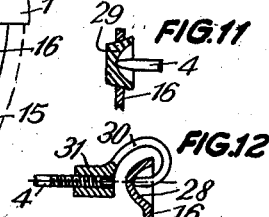
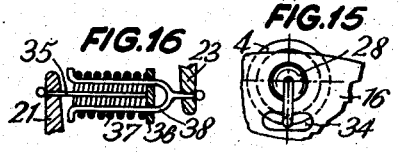
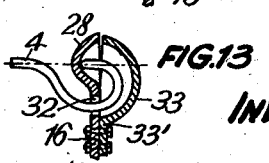
INVENTOR:
Herman Neidhart-Locher
by Sommers & Young
Attorneys Patented Aug. 15, 1950

2,518,809

UNITED STATES PATENT OFFICE 2,518,809

SPRING MOUNTING MEANS FOR VEHICLE WHEELS

Hermann Neidhart-Locher, Geneva, Switzerland

Application February 6, 1946, Serial No. 645,770
In Switzerland August 28, 1945

11 Claims. (Cl. 152—25)

This invention relates to spring mounting means for vehicles, revolving bodies, and more particularly for vehicle wheels and the like.

Resilient vehicle wheels are known in which helical springs are provided so as to be effective in the radial or the circumferential direction of the wheel or bowed leaf springs are provided which extend in the wheel plane or transversely thereof. It has further been proposed to use one or more endless resilient bands which are arranged along the wheel circumference.

All these known spring arrangements have drawbacks of various kinds which put their applicability to practice in question or limit the same at least.

The present invention has for its object to provide spring mounting means for vehicles, bodies produced in revolution, and most particularly vehicle wheels, and so forth, in which, by means of helical springs which surround an axle and extend in the direction of this axle, swingably yielding connection is established between two parts which are relatively movable in a direction transversely of said axle, for example, between the axle and the body of a vehicle or between the hub and the wheel rim of a vehicle wheel, and so on.

In accordance with the invention when used for resiliently supporting two wheel portions, especially wheels for vehicles, coil springs having pointed ends are suspended in the two parts, the coil springs extending in the same or in approximately one and the same axial direction and in such fashion as to permit relative movements of the parts transverse to this axial direction when the springs effect oscillatory movements accompanied by changes in length.

It is only this specific method of support that permits operation of the springs without lubrication while yet providing a support that undergoes very little wear. Each individual spring can move all around or oscillate, hence its correct functioning is not impaired. The springs are spared and remain permanently effective and it is not necessary to supervise them, and due to the simplicity of the construction the reliability of operation is increased and makes for cheap production.

Since these helical springs are constantly stressed longitudinally, apart from the influence of the loading being imposed thereon, for example, on a vehicle wheel, in which additional longitudinal stressing ensues from radial shocks, lateral thrusts, acceleration and deceleration moments, these springs have a correspondingly advantageous damping effect, while they are preserved and the risk of rupture is obviated. At the same time relatively smooth resilience of the spring mounting arrangement is obtained so that, in applying this kind of spring mounting to vehicle wheels, smoothness of run also in starting ensues. The construction of this spring mounting arrangement is simple and the manufacture is accordingly cheapened.

Several embodiments of the present invention are schematically illustrated, by way of example only, in the partly schematical drawings, in which:

Fig. 1 shows, as a first example, an elevation of a spring mounting arrangement which is arranged between the axle and the body of a road vehicle.

Fig. 2 shows a modification of this example in a view similar to Fig. 1.

Fig. 3 shows a radial section of a further example representing a wheel for a road vehicle.

Fig. 4 shows a partial side elevation of Fig. 3.

Fig. 5 shows a radial section of a modified wheel for use as a road vehicle also.

Fig. 6 shows a partial side elevation of a further example representing a wheel for a rail vehicle.

Fig. 7 shows a radial section of Fig. 6.

Fig. 8 is a schematic view for explaining the spring effect.

Fig. 9 shows a radial part-section of a road vehicle wheel for explaining a structural detail.

Figs. 10 to 14 represent various seatings of helical springs in corresponding sectional views.

Fig. 15 shows a side elevation of Fig. 14, and

Fig. 16 shows a longitudinal section of an arrangement of a compression spring arrangement also embodying the invention.

In Fig. 1, the numeral 1 designates a continuous wheel axle carried by two road wheels 2. Laterally of each road wheel 2, on the wheel axle 1, a hub disc 3 is axially adjustably arranged. With each hub disc 3 engage by means of one of their ends several helical tension springs 4 the other ends of which are connected to a ring 5 which is rigidly connected to a bridging member 6, that is, the supporting frame for the vehicle body. The helical springs 4 are uniformly distributed over the periphery of a circle surrounding the axle 1 and are arranged on the fixed hub disc 3 so as to extend in the direction of said axle. The coil springs 4, for which fixed seatings are provided on the hub discs 3, provide a swingably yielding connection between the wheel axle 1 and the bridging member 6 which is movable to a smaller or greater extent in any direction, especially in the transverse direction to the axle. Due to the hub discs 3 being individually adjustable in the axial direction, initial stressing can be obtained for the helical springs 4.

As shown in Fig. 2, two swingable axles 7 are substituted for the continuous axle. These are are mounted at 8 and 9, respectively, on a common carrier body 10 and connected by means of said body with the bridging member 6 of the vehicle. On each swingable axle 7 two hub discs 3 are fastened with each of which engages a group of helical tension springs 4, so that the springs of each group are uniformly divided over the periphery of two separate circles.

The tension springs 4 of one of these groups are arranged on the left hand side and those of the other group on the right hand side of a common spring mounting 11 which is provided on the bridging member 6 and is engaged by the other ends of said springs. Therefore, the swingable axles 7, each of which passes through a mating opening in the respective mounting 11, extend in two parallel groups, that is, circular rows of helical tension springs 4, which are seated at fixed points in the hub discs.

The wheel shown in Figs. 3 and 4 is provided with a wheel rim 12 for the reception of a double tire 13, 14. The wheel rim 12 carries a central radially inwardly directed annular web 15 with which engage by means of their one end several helical springs 4 which extend transversely to the wheel plane. Two groups of such tension springs 4 are provided and arranged on the left and right hand sides of the annular web 15, respectively. The tension springs 4 of each group engage with their second ends with an associated hub disc 16, both of which are secured to the axle 1 of the wheel. The springs 4 of each of the two groups are arranged in corresponding circular rows at uniform spacings apart, so as to alternate in succession. Alternatively the total number of springs 4 may be uniformly distributed over two concentrical circles. By means of the helical springs 4 the wheel rim 12 is elastically connected with the two fixed hub discs 16.

Fig. 5 represents a single-tire arrangement 13, which is applied to the wheel rim 12', and has two radially inwardly directed side webs 17 and 18. Between these side webs 17, 18 on the wheel rim 12, is arranged the hub disc 16' which is fastened to the wheel axle 1 and carries the helical springs 4 of both groups, being in engagement with the two sides of said disc respectively. The tension springs 4 of the two groups engage by means of the second ends thereof with the respective side webs 17 and 18 on the wheel rim 12, whereby the latter is resiliently connected with the hub disc 16'.

In Figs. 6 and 7 is disclosed a wheel which has a wheel flange 19 and is provided on one of its end faces with spoke stubs 20 which extend radially inwardly from the wheel rim 19' and are oppositely disposed to a disc which is provided with spoke stubs 21. The spoke stubs 20 on the wheel rim 19' engage with helical tension springs 4 the second ends of which engage with spoke stubs 22 on a disc which is fastened to the wheel axle 1, thereby to establish resilient connection between said disc and the spoke stubs 20. The wheel is further provided on the second end face thereof with spoke stubs 23 which extend from the wheel rim 19' radially inwardly and are connected by means of helical tension springs 4 with the spoke stubs 21.

With reference to the construction of Fig. 3, in Fig. 8 two hub discs 16 are schematically indicated which are fixed to the wheel axle 1. The numeral 15 refers to the central radially directed web on the wheel rim 12 and the numeral 4 refers again to the helical tension springs which elastically connect the wheel rim 12 with the two fixed hub discs 16. To the tension springs 4 are correlated seatings which are fixed to the hub discs 16. The wheel rim 12 can be moved mainly in the radial direction, that is, in the plane of the wheel provided that it is accordingly loaded, whereas in the transverse direction it is much less subject to movement. In said rim moving in the former direction, the springs 4 swing about the fixed fulcrums as provided for them on the hub discs 16, thereby to carry out oscillatory movements. Said oscillatory movements can take place within the embrace of a cone the apex of which is determined by the fixed points mentioned above and the basic circle of which is defined, for example, by the line $a$, as indicated in Fig. 8, in connection wherewith the full line contour of the wheel rim $b$, as assumed for the condition of rest of the wheel can be shifted radially inwardly or outwardly as required, for example, within the limits as indicated in dash lines $c$ and $d$ in Fig. 8. In Fig. 8, of the two helical springs 4 being shown on the left hand and the right hand side, respectively, of the radial web 15 of the wheel rim, the former is in its extreme outer position and the latter in its extreme inner position. The helical springs 4, as provided, are of a relatively short and strong kind the windings of which bear against each other tightly, so that only after a certain amount of thrust exertion spring play can set up.

When the load applied remains constant and the roadway is plane, all the springs 4 of the wheel will describe a perfectly conical surface during each revolution of the wheel. Due to the capacity of the springs to oscillate freely, that is, perform oscillatory movements which, if shocks arise, depart from the form of a perfectly conical surface, the helical springs 4 are exempt from being subjected to changes of stressing as otherwise arising by effect of the revolving wheels, and all the wheels share uniformly in carrying the load disregarding the height and the lateral disposition which the springs may have relative to the wheel hub.

In Fig. 9, the illustration of which is based on a wheel construction as shown in Fig. 5, a plurality of studs 24 are shown to be arranged on the juxtaposed faces of the lateral wheel rim portions 17 and 18. These studs 24 are intended for cooperation with the hub disc 16, being fixed to the wheel axle 1, for the purpose of preventing the wheel rim 12 from excessive tilting relative to the wheel axle 1 that may arise during spring play.

As shown in Fig. 10, the hub disc 16 contains a socket 28 into which the tension spring 4 projects by means of the rounded tip of its bent end.

The construction that is shown in Fig. 11 differs insofar as an insert 29, which is arranged in the wheel disc 16, as in the form of a socket. This insertion socket 29, which is suitably made of a hardened material, is pressed into an aperture in the wheel disc 16 by means of a conical surface and is adapted to be exchanged, if required.

Referring to Fig. 12, it will be seen that in a socket 28 is seated a hook 30, having a rounded end and a threaded portion 31, with which is threadedly connected the end of a tension spring 4. This construction permits regulating the initial stressing of the spring.

As regards Fig. 13, the tension spring 4 is shown to engage with its hook-like end into a socket 28, in such manner, that this spring 4 protrudes through an opening 32 in the hub disc 16. The socket 28 is covered by a cap 33 which is detachably connected to the hub disc 16 by means of a lug 33'. The cap 33 prevents the tension spring from separating from the socket 28 and safeguards the hooked spring end. Instead of arranging such a cap, at the seat of each individual tension spring 4, a ring may be provided on the hub disc 16 which is given a concave cross section and covers all the seats for the tension springs 4 that engage with the hub disc 16 and are disposed on a circle.

Figs. 14 and 15 show a slot 34 to be provided in the wheel disc 16 for the passage of the engaging hook on the helical spring 4, for the purpose of preventing this tension spring 4 from disengagement by giving a size to the slot 34 leaving sufficient clearance for the tension spring 4 to perform lateral displacing movements.

If the ends of the tension springs 4 are provided with anchoring hooks, the spring ends lie in the axes of the springs, as indicated by chain-dotted lines in Figs. 12 to 14, whereby perfect functioning is warranted.

Instead of tension springs 4, helical compression springs may be provided as shown, for example, in Fig. 16 which illustrates an exemplification of the invention similar to that depicted in Fig. 7. In the former figure spoke stubs 21 and 23 are shown to be relatively offset in the axial direction. The stub 21 of said spoke stubs is engaged by a bolt 35 which carries a flat abutment 36 against which bears one of the ends of a compression spring 37 which is in the form of a helical spring. The second end of the compression spring 37 abuts against the bent ends of the arms of a forked holder 38 which engages with the outer end of a spoke stub 23. The fork arms of the holder 38 project through holes in the abutment 36 with play so that by corresponding action of the spoke stubs 21 and 23 appropriate functioning of the compression spring 37 is possible by relative axial movement between the holder 38 and the bolt 35, that is, a functioning similar to that as described for the individual tension spring 4.

The functioning of the stop studs 24 shown in Fig. 9 can, dependent upon requirements, be obtained also by means of terminal loops on springs 4 or parts, such as caps 33 (Fig. 13), that cover said terminal loops, so that the said studs 24 can be dispensed with.

The term helical spring, as hereinbefore used, is to be understood in the broadest sense of this word, so as to include also single or double helical springs as well as coiled springs of other kind. The helical springs as provided need not necessarily be exactly parallel to the axis about which they are arranged. Deviations to a smaller extent do not affect the proper functioning of the resilient mounting and the preserving of the springs.

I claim:

1. A spring mounting arrangement for vehicles and the like, comprising a plurality of relatively movable parts provided with sockets, and a plurality of coil springs having rounded ends of small size, said ends being coaxial with the respective spring axes, having point contact with each of said parts in said sockets and connecting the same, said springs being disposed in approximately parallel relation and permitting relative movement of said parts when the springs oscillate and change in length.

2. The combination of claim 1 wherein the rounded ends form portions of hooks disposed along the spring axes.

3. The combination of claim 1 wherein the rounded ends are fashioned into hooks integral with the springs.

4. The combination of claim 1 where the rounded ends are formed on hooks which are adjustably connected with the springs.

5. A spring mounting for vehicles and the like, comprising a plurality of substantially parallel relatively movable members, each having circumferentially spaced cup-like spring pockets, and a plurality of coil springs having rounded ends of small size disposed in said pockets and in point contact therewith, said springs connecting said members with the springs substantially parallel, and permitting relative movement of said members when the springs are flexed, the ends of said springs being coaxial with the respective spring axes.

6. The combination of claim 1 where the deflection of said parts is limited by projecting means on at least one of said parts and a disc on the other.

7. The combination of claim 1 wherein the springs are in compression.

8. The combination of claim 5 where the rounded ends are formed on hooks adjustably connected with the main bodies of the springs.

9. The combination set forth in claim 5 where the pockets are elements separate from the movable members.

10. A spring mounting for vehicles and the like comprising a plurality of substantially parallel relatively movable members extending in juxtaposition to each other, and a plurality of annularly disposed tension spring having rounded ends of small size connecting said members and engaging said members by point contact only.

11. A spring mounting for vehicles and the like comprising two relatively movable members, one of which carries two substantially parallel projecting flanges and the other of which carries a single projecting flange disposed between the flanges of said one member, and two sets of annularly disposed tension springs connecting the single flange with the other flanges, the springs being provided with rounded ends of small size engaging the flanges by point contact only, said springs being arranged substantially parallel with each other.

HERMANN NEIDHART-LOCHER.

REFERENCES CITED

The following references are of record in the file of this patent:

UNITED STATES PATENTS

| Number | Name | Date |
| --- | --- | --- |
| Re. 14,057 | Painchaud | Feb. 1, 1916 |
| 1,037,699 | Wilmot | Sept. 3, 1912 |
| 1,079,925 | Prather | Nov. 25, 1913 |
| 1,080,378 | Sipe et al. | Dec. 2, 1913 |
| 1,089,601 | Swing | Mar. 10, 1914 |

FOREIGN PATENTS

| Number | Country | Date |
| --- | --- | --- |
| 612,039 | Germany | Mar. 21, 1935 |